April 18, 1933.  E. KENNEDY  1,904,689
TESTING DEVICE FOR WATER SYSTEMS
Filed Sept. 20, 1930

Inventor
Edward Kennedy
By C. P. Gapel,
Attorney

Patented Apr. 18, 1933

1,904,689

UNITED STATES PATENT OFFICE

EDWARD KENNEDY, OF NEW YORK, N. Y.

TESTING DEVICE FOR WATER SYSTEMS

Application filed September 20, 1930. Serial No. 483,363.

The present invention relates to improvements in testing devices for water systems, and has for an object to provide certain improvements over my prior Patent No. 1,155,821, granted October 5, 1915.

It is another object of the invention to provide an improved testing device for removable mounting in a pipe joint, whereby the same will function to hold the interfitting pipe section in place while the joint material is being packed thereabout.

A further object of the invention is to provide an improved testing device which is removably mounted within the pipe joint and acts to drain the same.

With the foregoing and other objects in view, the invention will be more fully described hereinafter and will be more particularly pointed out in the claims appended hereto.

Figure 1:
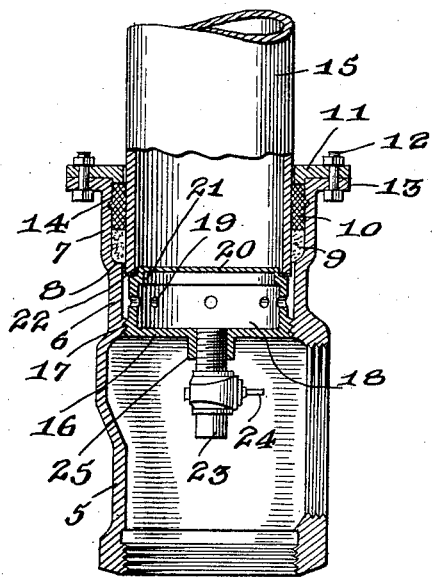
Figure 2:
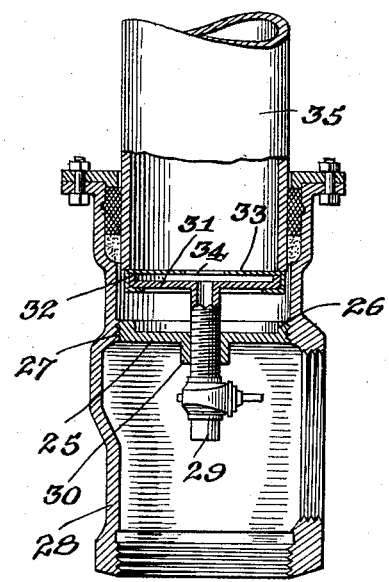

In the drawing, wherein like symbols refer to like or corresponding parts throughout the several views, Figure 1 is a vertical section of an improved testing device for water systems constructed according to the present invention, and Figure 2 is a similar view showing a modification.

Referring more particularly to the drawing, 5 designates a pipe joint having a constricted portion 6 inwardly of an enlarged packing gland 7. A shoulder 8 is provided between the constricted part 6 and the packing box.

In this packing box is adapted to be received any appropriate packing material, for instance, the lead packing 9 and the waste or fiber 10. A plate 11 is employed to hold the packing material in place, such plate being secured in place as by the use of bolts or other fastenings 12, which pass through the plate 11, and out-turned flanges 13 upon the pipe joint. Preferably, the plate 11 is shouldered or flanged, as indicated at 14, to take up a proper position and to properly center the interfitting pipe section 15. Removably mounted within the pipe union 5 is a testing plug 16 having an external screw thread near its base for cooperating with the screw threads 17 upon the lower part of the constricted neck 6. A flange 18 of the testing plug is provided with perforations 19 therethrough, and a top plate 20 encloses the hollow plug 16. A reduced shoulder 21 is provided upon the removable testing plug near its upper outer end for receiving the adjacent end of the interfitting pipe section 15. A packing ring or gasket 22 preferably seats upon this shoulder. The drain pipe is indicated at 23, having the valve 24 therein, this drain pipe being threaded in a depending internally threaded boss 25 of the plug base 16. In practice, the plug 16 is screwed in place, the pipe section 15 is slid into the pipe union 5 until the lower end of such section rests on the shoulder 21 or rather upon the gasket 22 placed upon such shoulder.

Thus, the testing plug has the effect both to support the pipe section 15 and to limit its inner movement so that it always takes up a correct position with respect to the packing box and to the constricted neck 6. It will be noted that the inner end of the interfitting pipe section 15 preferably overlaps the constricted neck to a slight extent, but that this inner end of the pipe section 15 is spaced from the threads 17 whereby, when the plug 16 is removed after testing, there will be ample space for the pipe 15 to expand and contract. When the pipe 15 is put in place upon the plug, the packing material 9 and 10 may be loaded into the packing or stuffing box. The plate 11 is subsequently put in place and the bolts 12 attached. In testing the system the plug 16 is partially threaded outwardly from the portion 6 of the joint member so that the water may pass freely from the pipe 15 into the annular space between the plug and the reduced part 6 of said member and hence through the openings 19 in the wall of the plug to the drain pipe 23. After testing, the plug 16 is removed by screwing the same downwardly.

Referring more particularly to Figure 2, a plug or disk 25 having a shallow flange 26 is shown as engaged with the screw threads of the pipe union 28. The drain pipe 29 is threaded through a threaded boss 30 of the disk 25 and extends up above the disk, where it carries a second disk 31 having a flange 32 upstanding from its marginal edge engaged by a sheet of rubber 33 having an opening 34 in alignment with the drain pipe 29.

The interfitting pipe section 35 is adapted to seat upon the rubber material 33 and rest upon the flange 32. The other parts are substantially the same as described in connection with Figure 1. The disk 31 may be adjusted up and down by turning the drain pipe 29 through the disk 25, which forms a base disk which need not be adjusted. Thus, the inner end of the pipe 35 may be held in place and caused to take position as desired. In this construction, it is not necessary to first disengage the plug from the end of the pipe 35 in making a test, as the water will pass directly from said pipe through opening 34 to the drain pipe 29. After the test is completed, disc 25 is unthreaded from its connection with the joint member and together with the testing plug is removed therefrom.

It will be obvious that various changes in the construction, combination and arrangement of parts could be made, which could be used without departing from the spirit of my invention, and I do not mean to limit the invention to such details except as particularly pointed out in the claims.

Having thus described my invention, what I claim and desire to secure by Letters Patent of the United States is:—

1. In combination with a pipe joint member within one end of which a pipe is adapted to be fitted and secured by suitable packing, a hollow testing plug and means for adjustably and removably mounting the same within the joint member, a drain pipe connection to said plug, and said plug adapted to be adjustably positioned within the joint member to support the pipe end therein while the joint is being packed, and a wall of said hollow plug being provided with an opening affording communication in one position of the plug between the interior of the pipe and said drain connection.

2. In combination with a pipe joint member in one end of which the pipe section is adapted to be secured by means of suitable packing, a hollow testing plug, said plug and the wall of the pipe fitting having cooperating threaded portions to adjustably and removably retain the testing plug within said member and with the cylindrical wall of the plug spaced from the wall of the joint member to provide an annular space therebetween, said plug wall having openings therein connecting said space with the interior of the plug, and one end of said plug being formed with an annular seat to receive the end of the pipe section and support the same within the joint member while being packed, and a drain pipe connection with the other end of said plug, and said plug adapted to be adjusted within the joint member to permit water to enter said annular space from the pipe and pass through said openings to the interior of the plug and hence to the drain pipe.

In testimony that I claim the foregoing as my invention, I have signed my name hereto.

EDWARD KENNEDY.